United States Patent
Willner et al.

[11] Patent Number: 6,064,666
[45] Date of Patent: May 16, 2000

[54] CROSS SERVICE COMMON USER IMAGE ASSOCIATION

[75] Inventors: Barry E. Willner, Briarcliff Manor, N.Y.; Marc A. Block, Fairfield, Conn.; Stephen Brady, White Plains, N.Y.; Davis Foulger, Wappingers Falls, N.Y.; Alan G. Ganek, Chappaqua, N.Y.; Colin G. Harrison, Brookfield, Conn.; Barry Marks, Parsippany; Thomas E. Newman, High Bridge, both of N.J.; Gopalaswamy Soora, Cary, N.C.; Edith H. Stern, Boca Raton, Fla.; Asser N. Tantawi, Somers, N.Y.

[73] Assignee: International Business Machines Corporation, Armonk, N.Y.

[21] Appl. No.: 08/751,091

[22] Filed: Nov. 15, 1996

[51] Int. Cl.[7] .......................... H04L 12/66; H04L 12/28; H04J 3/16; H04M 3/42
[52] U.S. Cl. ........................ 370/352; 370/389; 379/67.1; 379/201; 379/207; 379/214
[58] Field of Search ..................................... 370/352, 353, 370/380, 389, 392, 396, 401, 404, 427, 435, 450, 465, 455; 379/90.01, 93.01, 93.05, 93.09, 100.15, 100.16, 900, 201, 207, 214, 67.1, 88.01

[56] References Cited

U.S. PATENT DOCUMENTS

| | | |
|---|---|---|
| 5,224,205 | 6/1993 | Dinkin et al. ............................ 395/200 |
| 5,327,486 | 7/1994 | Wolff et al. ................................ 379/96 |
| 5,384,381 | 1/1995 | Creswell et al. .......................... 379/67 |
| 5,566,229 | 10/1996 | Hou et al. ................................. 379/88 |
| 5,608,786 | 3/1997 | Gordon ................................... 379/100 |
| 5,610,910 | 3/1997 | Focsaneanu et al. .................... 370/351 |
| 5,742,905 | 4/1998 | Pepe et al. ............................... 455/461 |

*Primary Examiner*—Chau Nguyen
*Assistant Examiner*—Allan Hoosain
*Attorney, Agent, or Firm*—Ohlandt, Greeley, Ruggiero & Perle

[57] ABSTRACT

An apparatus and means enabling a user to operate across multiple service domains using a single IDENTIFIER, ID. A Cross Service Association Domain mapping system is used to allow the desired IDENTIFIER and common user integration. A user is able to employ a single appropriate ID to access any of a plurality of services. The apparatus associates and relates all the IDENTIFIERs associated with each common user by maintaining an image of all the IDENTIFIERs for each user for all that user's applications which bridge the service and/or domain boundaries. Once a user is identified with any of the associated user IDENTIFIERs, the means allows the connection and/or routing to and from even otherwise disparate services. Included are a method, apparatus, and architecture which satisfies the above requirements while providing domain service interrelation and a common user image for the resulting interrelation. It provides for real time collaboration for cooperative, shared, and adaptive service network entities. The invention is used to advantage in many existent and developing service and user applications including applications for service support, cross service end user interfaces, service media transformations and multi-media cross services.

66 Claims, 8 Drawing Sheets

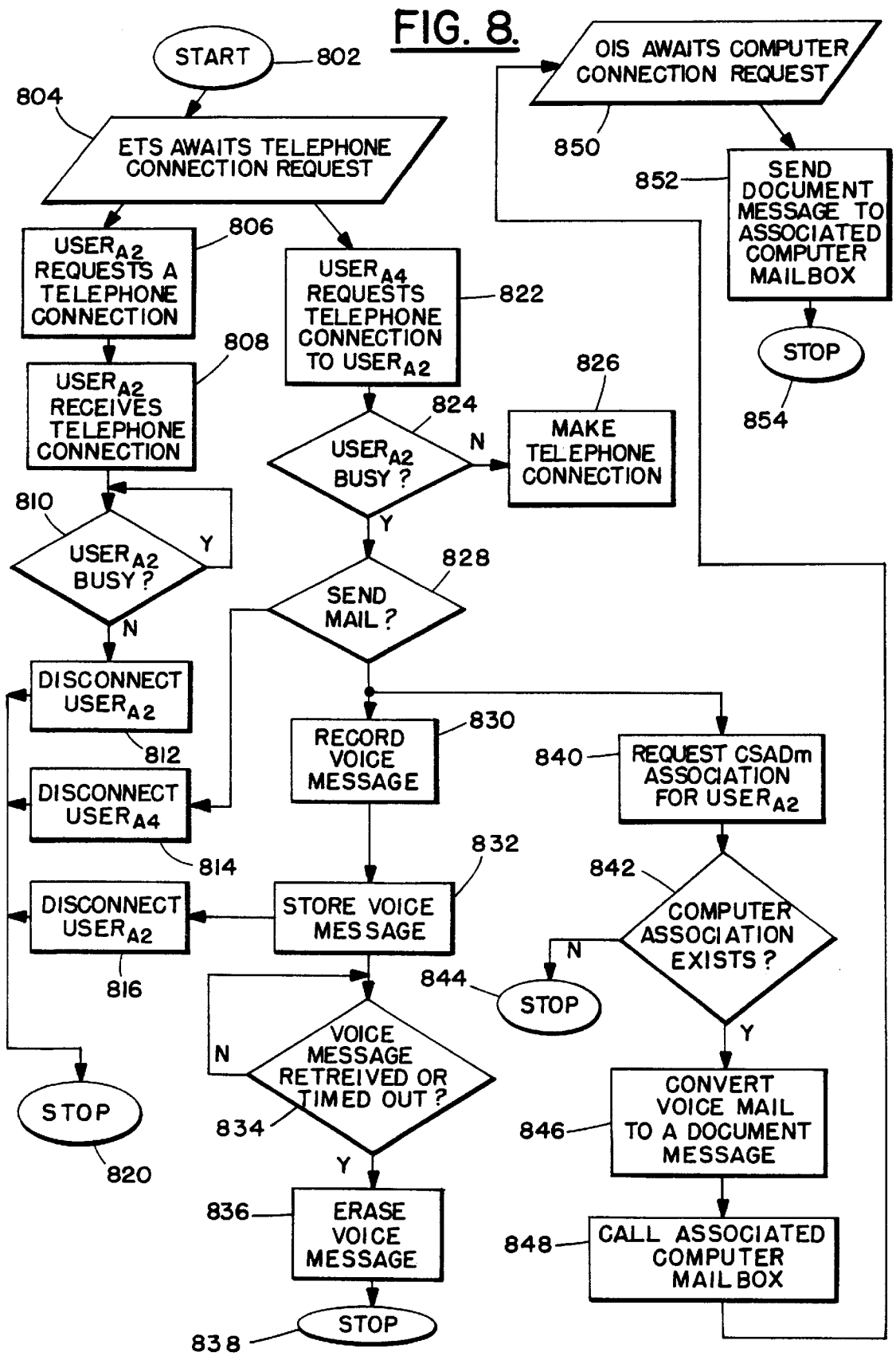

CROSS SERVICE COMMON USER IMAGE ASSOCIATION

FIELD OF THE INVENTION

The present invention is directed to the field of enhanced communications service provision. It is more specifically related to cross domain user identification and common service provision.

BACKGROUND OF THE INVENTION

It is a constant endeavor to find methods, structures and architectures which enable users to interact with applications and users on services other than their own. This has resulted in the present form of enhanced telephone services. These service provisions generally have evolved through piecemeal enhancements of the established and connection oriented telephony network. As such, the provisions observe traditional telephony standards which include seasoned, established procedures for end user identification and end user keying behaviors. The developing and continually growing cross-utilization of telephones and computers require new and creative means to allow users of disparate voice, data and multi-media services to interact with applications and users on services other than their own. These services include but are not limited to those which are voice oriented such as enhanced telephony services, those which are data oriented such as on-line information services, those which are image oriented such as video on-demand, and those which are coordinated and/or composite such as multi-media services. As an example, user accessible enhanced telephony services presently include voice mail and follow-me universal phone number services.

The emergent array of on-line services which are oriented to information distribution as well as communication between users, have adopted naming conventions and domains which have been heretofore generally associated with data processing. With the advent of broad usage of the Internet, and with advancements in technologies such as voice recognition and synthesis, the borders between the applications which are possible for these disparate services are rapidly weakening, dissipating and disappearing. Generally, the interaction between disparate services has been possible only through the adoption of a common denominator for naming, such as is used in the Internet naming standards. As multi-media technologies and on-line service proprietary protocols proliferate, the ability to interrelate service domains becomes key to expanding service possibilities.

This proliferation of available services has also lead to a growth in the number of identifiers employed by each single end user. Normally, an end user employs a separate 'IDENTIFIER' appropriate to each device, service and/or access network to enable access to each particular offering. For example, a user of enhanced voice services is identified by a phone number. A user of an on-line service is identified by an on-line service IDENTIFIER in a particular address domain. Particular cross service accesses may not be available. If a particular cross service access is available, an array of IDENTIFIERs and passwords is often required prior to delivery of the service to satisfy the user's request.

Efficient means is required to enable a user to operate across multiple service domains using a single IDENTIFIER. In any specific user utilization the user ought to be able to employ a single appropriate IDENTIFIER, possibly being dependent upon the user's choice of access media. The means should associate and relate the IDENTIFIERs associated with each common user by maintaining an image of the IDENTIFIERs for each user for that user's applications which bridge the service and/or domain boundaries. In this way, once a user is identified with any of the associated user IDENTIFIERs, the means should allow the connection and/or routing to and from the disparate services. The means should automatically provide the appropriate IDENTIFIER or IDENTIFIERs to cross all the required service and/or domain boundaries to satisfy the user's request. In this way the means would maintain an image for each user for applications which bridge the service boundaries.

The present invention provides a method, apparatus, and architecture which satisfies the above requirements while providing other advantages. Thus among other things, an object of the present application is a solution that provides domain service interrelation and a common user image for the interrelation.

The following provides a definition of terms used in this application:

Domain: a place where addressing following a particular set of rules is understood. Example—telephone numbers, Internet addresses, America-On-Line;

Interrelated domains: Domains which have the same rules and/or recognize each other's addresses;

Connection Modality: Voice, Data, Image, Video etc.;

Access media: means of effecting reception and/or transmission of a communication;

Service: something provided for clients. Example—POTS, America-On-Line, Compuserve, WWW access, conferencing;

Cross service: interaction between at least two services and/or two modalities. Example—Using a computer to change telephone speed dialing;

Graphical user interface: user interface that is more than text and less than video. Examples—Lotus interface, web explorer interface, visual age;

Service media transformation: voice to text, text to voice, etc.;

On-line service: America-On-Line (AOL), Compuserve, Prodigy;

Composite service: a multi-media service where individual media might be viable services themselves. Example—voice and data conferencing. Voice conferencing is viable, and so is data conferencing;

Disparate services: different services—in customer client instruments (i.e. telephone and computer) and/or different application areas or services requiring different access modalities. like real-time versus asynchronous;

Interactive service: requires relatively rapid response, such as end user keystrokes, to do something. Example—VM, AOL;

Password: secret required to gain service;

Service registration: a process whereby an end user is made known in all necessary detail to a service. May include billing, addressing, etc. information. May be real-time or not. May be via human operator or not;

Service provisioning: process whereby end user gets what is needed to use the service. May be client code, etc.;

Application: end user function provided as either a stand alone or in conjunction with other end user functions;

Real time collaboration: end user interactions that are not delayed etc. Example—telephone call between two human beings;

Tools for collaboration: Example—telephones, Lotus Notes, Shared white-boards;

Cooperative services: services that have agreements, hardware and or software intended to allow interworking;

Adaptive service: services that have hardware and or software intended to allow interworking;

User interface: Example—telephone keypad, computer keyboard & screen;

Internet access service: Example—Advantis, SNET, Bell Canada;

Chat service: real-time typing between two or more people; as on AOL or an Internet server;

Primary entity: the main entity being considered;

Remote connection: a connection made to a network entity other than the primary entity;

Remote entity: an entity other than the primary entity;

Remote interface: an interface between the primary entity (or entity being considered) and a remote entity;

Remote user: a user connected through a remote entity;

ID: used to identify a user or client requesting access to a service, also called IDENTIFIER;

Personal computer or computer: includes any computer or media through which a user can communicate interactively with another user, usually including display means, input and output means and storage means.

SUMMARY OF THE INVENTION

It is an aspect of the present invention to provide an apparatus, method and architecture for a service network with cross service association, domain mapping and collaboration. The network provides cross connection, integration and association of a plurality of users and services. The various service identification IDENTIFIERs of each user are mapped into a common user image. Every one of the mapped IDENTIFIERs in each user's image is used to enable pass-through and/or access to provision of the user service requested by that user. Any associated IDENTIFIER is useable to access a service other than that to which it was originally assigned. Moreover, the access may be made from any of the different types of the user's attached access media and in the variety of stored domains for that user.

The invention includes a Cross Service Association Domain mapping (CSADm) system to allow the desired association and user integration formed and/or used by an Enhanced Telephony Service (ETS) provider. The ETS is implemented such as to provide the association and integration for a multiplicity of users and services. The invention is also used to advantage in applications for service support, cross service end user interfaces, service media transformations and multi-media cross services.

An aspect of the present invention is a network apparatus for providing network services to a plurality of primary users, wherein each of the primary users has a plurality of service IDENTIFIERs. The apparatus is comprised of a primary user interface means for interfacing with the primary users, a cross connect means coupled to the primary user interface means, and a primary user image database means for correlating, storing and associating the IDENTIFIERs for each of the primary users. The primary user image database is coupled to the cross connect means.

In one embodiment the apparatus is further comprised of a remote interface means coupled to the cross connect means for connecting the apparatus to at least one remote service means. In another embodiment the apparatus operates in a first domain and at least one of the remote service means operates in a second domain. The apparatus further includes a converting means for converting between the first and second domains.

In still another embodiment the apparatus further comprises at least one remote service means. The remote service means includes a plurality of remote user interface means for coupling to a plurality of remote users. In one implementation, the entity that includes the apparatus operates in a first domain and the remote service means operates in a second domain, and the apparatus further includes a converting means for converting the second domain to the first domain. The remote service means may include a remote user image data base means for storing and correlating the IDENTIFIERs for each of the remote users. In another aspect of the present invention, each of the primary users of the apparatus has a plurality of primary access means being coupled to the primary interface means.

In still another embodiment the primary users are service users of a plurality of user services and each of the service IDENTIFIERs is an identification for identifying the service users when one of the service users makes a request for one of the user services as required by the user service to provide satisfaction of the request.

In still another embodiment the apparatus comprises a common image operation means for performing a user related operation for the user image database. In one implementation the operation is a billing operation for collectively billing each of the users for a plurality of service utilizations of a plurality of service IDENTIFIERs of the each of the users.

It is another aspect of the present invention to provide a network correlation method for a primary network servicing a plurality of primary users. Each of the primary users have a plurality of IDENTIFIERs for a plurality of user services. The method comprises the steps of storing and correlating the IDENTIFIERs for each of the primary users as a primary user image, receiving one of the IDENTIFIERs from one of the primary users in a first domain, and converting the user IDENTIFIER to a second domain required for access to one of the user services.

Another aspect of the present invention is the apparatus having a database used to determine a first user's first IDENTIFIER required for the first user to access a first service by associating the first user's second IDENTIFIER for a second service, so that the first user may access the first service by accessing the second service using the second IDENTIFIER. In one embodiment the first service is an on-line information service and the second service is a voice telephone service.

Still another aspect of the present invention is an apparatus wherein the database means stores a plurality of separate passwords for at least one of the users corresponding with each of at least two of the primary IDENTIFIERs. In one embodiment of the apparatus, one of the passwords is entered by a first user, from among the primary users, to verify the first user for a first service offering and another separate password is retrieved from the database to provide verification of the first user for a second service offering.

Another aspect of the present invention is a shared service apparatus serving a plurality of network entities. Each of the network entities serves a plurality of entity users. Each of the entity users has a plurality of service IDENTIFIERs. Each of the service IDENTIFIERs is used to identify one of the users for one of a plurality of user services. The apparatus includes a user image database means for storing and associating the service IDENTIFIERs of each of the entity users, and includes a communications linkage means for linking to at least two of the entities and for making information stored in the database means accessible to each of those two entities. In one embodiment, the apparatus is further comprised of a conversion means having a converter input and a converter output for converting a first signal representing one of the service IDENTIFIERs fed to the converter input in a first domain to a second signal representing the one of the service IDENTIFIERs in a second domain. The converter inputs and the converter outputs are accessible to at least one of the entities. In some cases, the conversion means is also for converting information received at the converter input in a first modality to information fed out of the converter output in a second modality and/or for converting information fed to the input in a first protocol to information fed out of the output in a second protocol.

In an embodiment of the apparatus, the image database means forms a cross service association domain mapping such that a first user accessing a first service of the user services using a first user first IDENTIFIER in a first domain, crosses the first service to access a second service of the user services requiring access using a first user second IDENTIFIER in a second domain, without the first-user entering the first user second IDENTIFIER, and wherein the first user second IDENTIFIER is provided to the second service by the first service which received the second IDENTIFIER by exercising the cross service association domain mapping for the first IDENTIFIER. In one embodiment, the second service is provided by an entity not adapted to use the database or the second user service is provided by an entity not cooperating with the database.

In one embodiment, the apparatus further comprises a common billing means for providing a common bill for each of the entity users based upon the users utilization of the entity user services accessed from any of the plurality of service IDENTIFIERs. In one case, the apparatus of the billing means includes a means for monitoring payment of bill data for each of the users and/or includes a means for providing information of good and bad bill paying habits for each of the users.

Another aspect of the invention is an apparatus further comprising a first histogram means for monitoring and maintaining a record of service usage for each of the users and for each of the user services. Often the record of service usage is used to provide information for a function selected from the functional group consisting of offering other services, reducing service rates, service advertisement, service abandonment, service enhancement, service maintenance, to one of the service user and any combination of these.

Another aspect of the invention is a network apparatus included in a plurality of network entities. Each entity provides a plurality of user services serving a plurality of service users. Each service of the service users is an owner of a plurality of service IDENTIFIERs. Each service IDENTIFIER is used to identify the owner for one of the services. The apparatus includes: a cross service association domain mapping means for associating the service IDENTIFIERs with the owner and with a related one of the user services; a storage means for storing the mapping means; and an interrogation means having an input and an output, the input for receiving an interrogation from a first user service for an IDENTIFIER association mapping for a first IDENTIFIER provided by a first owner, and the output for outputting a resulting IDENTIFIER association for the first owner. The resulting IDENTIFIER association mapping is used to provide the first owner with access to a second user service. In one case, the first user service is provided by a first one of the entities and the second user service is provided by second one of the entities. Sometimes the access to the first user service is in a first domain and access to the second user service is in a second domain. In one embodiment, the mapping means is accessed by a first entity which associates the plurality of IDENTIFIERs also for a plurality of second entity users of a second entity and/or the network environment includes at least one entity that does not have a cross service association domain mapping means.

Another aspect of the invention is a cross service apparatus comprising an enhanced telephone service means having a plurality of primary service users each of the primary service users having at least one primary service connection. The service users include a plurality of enhanced primary users having a plurality of primary service connections using a plurality of access media. Each primary service connection has an access IDENTIFIER. The enhanced telephone service means includes a primary cross service association domain mapping means for associating each access IDENTIFIER with a connection owner and with other access IDENTIFIERs owned by the connection owner. This results in a common association of an image of each of the connection owners. It has a storage means for storing the common association for the connection owners and a service control means for interrogating, controlling and monitoring the common association.

In one embodiment, the primary service connections of at least one of the enhanced primary users include at least one telephone and at least one computer and/or the enhanced users includes at least one voice connection medium and at least one data connection medium. In another embodiment, the access media for at least one of the enhanced users includes a multi-media computer having a voice connection and a data connection. In a further embodiment, the voice connection is connected to a first network entity and the data connection is connected to a second network entity and/or at least one of the enhanced users uses a first of the primary service connections to modify a parameter related to a second of the primary service connections. The first and second primary service connections are generally included in the common association for the connection owner.

In one embodiment, the first primary service connection is accessed by a computer, the second primary service connection is for a first telephone, and the parameter is a time period for call-forwarding a phone call placed to the first telephone to a second telephone. In one embodiment, the enhanced telephone service means further comprises a remote interface means for interfacing with a remote network entity. The remote entity has a plurality of remote entity users having at least one remote entity service connection. Each remote entity service connection has an IDENTIFIER and at least one remote entity service offering and a plurality of the remote entity users have a plurality of remote entity service connections. In one embodiment, the cross service domain mapping means includes a mapping of each of the remote entity users. In one embodiment, the cross service domain mapping means is accessible to the remote entity, and/or the remote entity includes a remote cross service association domain mapping means for mapping each of the remote entity service users.

Another aspect of the invention is an apparatus further comprising a media transformation means for transforming a message sent in a first modality to a message forwarded in a second modality. In one embodiment, the first modality is voice and the second modality is a document and/or the media transformation means is shared by another network entity. In one embodiment, the apparatus has a voice mail option means and a first user makes a phone call using a first phone number of a first phone of a second user and the first phone is busy, the first user exercises an option to send a voice mail message, the voice mail message is transformed into an e-mail message routed to a first computer IDENTIFIER of the second user associated with the first phone number in the cross service association domain mapping. In one embodiment, the voice mail message is stored in an original voice mail form for the second user to listen to on a voice mail receiving media.

Another aspect of the present invention is a network correlation method for a primary network servicing a plurality of primary users. Each of the primary users has a plurality of IDENTIFIERs for a plurality of user services. The method comprises the steps of: associating the IDENTIFIERs for each of the primary users as a primary user image; storing the associated IDENTIFIERs; and providing a common user image mapping. In one embodiment, the method further comprises the steps of receiving one of the IDENTIFIERs from one of the primary users in a first domain and converting the user IDENTIFIER to a second domain required for access to one of the user services.

Still another aspect of the present invention is a network apparatus for providing a plurality of network services to a plurality of primary users. These network services employ different primary IDENTIFIERs to identify a primary user. The network apparatus performs a server function for said network services and is comprised of a database means for storing for each said primary user, the different primary IDENTIFIERs in association with an indication of the primary user, and a control means coupled to the databases means and responsive to an input from a first network service of a primary IDENTIFIER of a primary user, for accessing from the database means a further primary IDENTIFIER for the primary user in respect of a second network service, to enable accomplishment of an action with respect to that second network service which requires the further primary IDENTIFIER.

Another facet of the present invention is a network apparatus for providing a plurality of network services to a plurality of primary users. The network services employ different primary IDENTIFIERs to identify a primary user. The network apparatus performs a server function for the network services and is comprised of a database means for storing for each primary user, the different primary IDENTIFIERs in association with an indication of that primary user, and control means coupled to the database means and responsive to an input from a primary user of a primary IDENTIFIER of that primary user in respect of a first network service, for accessing from the database means a further primary IDENTIFIER for said primary user in respect of a second network service, to enable accomplishment of an action with respect to the second network service which requires the further primary IDENTIFIER.

BRIEF DESCRIPTION OF THE DRAWINGS

These and other objects, features, and advantages of the present invention will become apparent upon further consideration of the following detailed description of the invention when read in conjunction with the drawing figures, in which:

FIG. 8 shows a flow diagram for an embodiment of a service media transformation;

DETAILED DESCRIPTION OF THE INVENTION

The present invention is an apparatus, method and architecture for a service network with cross service association and domain mapping. The network provides cross connection, integration and association of a plurality of users and services. The various service identification passwords of each user are mapped into a common user image. Every one of the mapped passwords in each user's image may be used by that user to enable pass-through and/or access to a provision of a user service upon that user's request. In this way, an IDENTIFIER (and/or password) may be used to also access a service other than that to which it was originally assigned. Moreover, the access may be made from any of the different types of the user's attached access media and in the variety of stored domains for that user.

Figure 1:
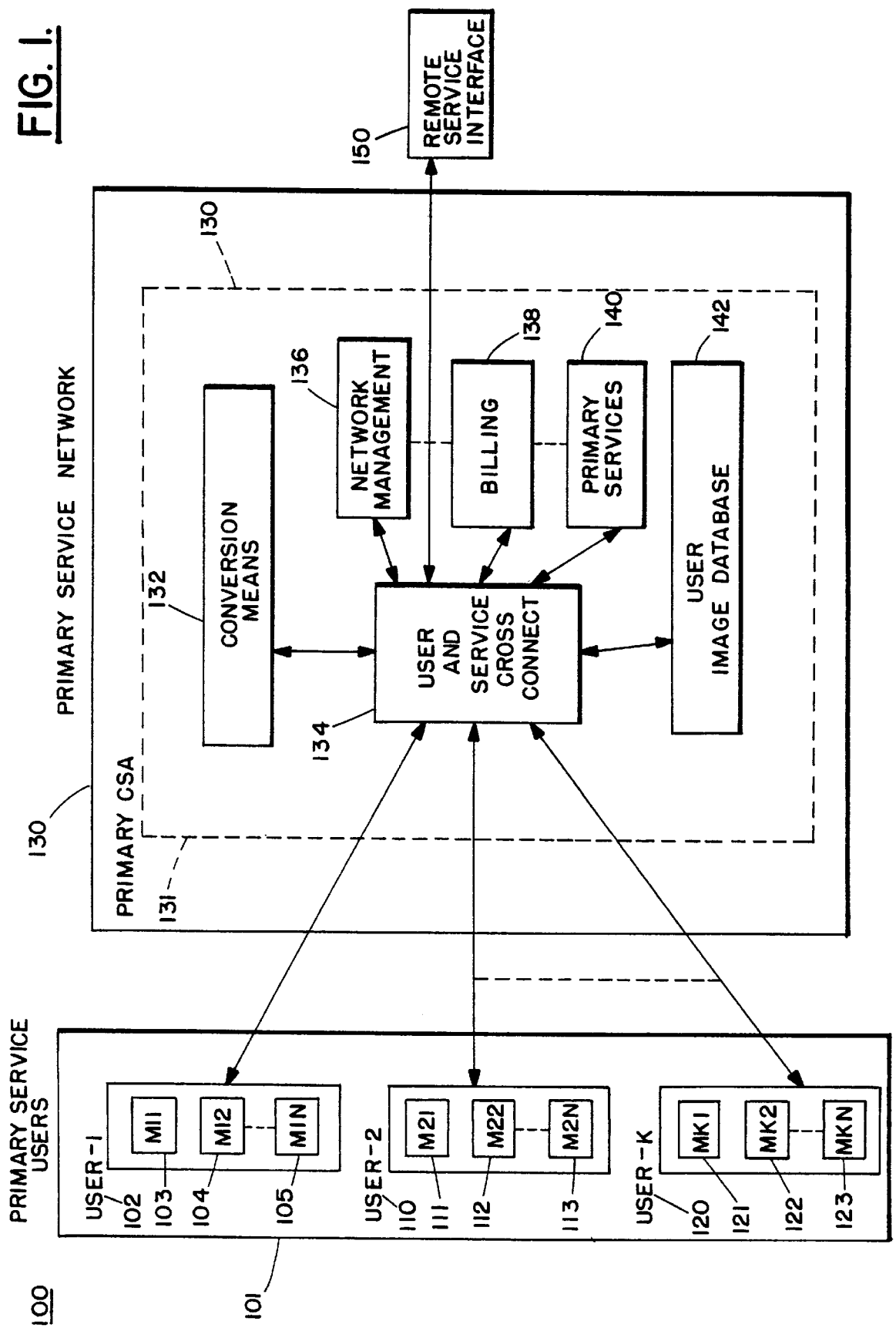
FIG. 1 shows a Cross Service Association Domain mapping system in accordance with the present invention.

A Cross Service Association Domain mapping (CSADm) system is used to allow the desired integration as shown in FIG. 1. The services that use the CSADm form the cross service domain services. An enhanced telephony service provider uses a Cross Service Association (CSA) system which includes or is interconnected with a CSADm. The CSA is implemented to provide the association and integration for a multiplicity of users and services. Heretofore, users had to employ an IDENTIFIER appropriate to the device, media and access network being used to access each different user service. With the subject invention, users can also be identified through an IDENTIFIER assigned to a different device or access network. For example, users of enhanced voice services can be identified by their phone number. Users of on-line services can be identified by the on-line service IDENTIFIERs. If a cross service access is required, the appropriate IDENTIFIER is retrieved from the mapping. In an embodiment of the present invention, if an IDENTIFIER is not available for the cross service access, an appropriate IDENTIFIER is created and temporarily logged into the CSADm to allow the connection or routing to and from even a disparate service.

The invention is used to advantage in many existent and developing service and user applications. These include applications for service support, cross service end user interfaces, service media transformations and multi-media cross services. Examples and particular implementations of these are provided subsequent to a broadened description of the invention.

FIG. 1 shows a cross service network 100. It includes an array of primary users 101, a primary service network 130, and a remote service interface 150. The array of primary users 101 includes "k" users from USER, 102 to USER$_k$ 120. Each user may have up to 'N' network access means.

Each access means may use any appropriate access media such as a telephone, computer, dumb terminals and wireless connection. The mixed media may use a variety of addressing domains. For example, $USER_1$ has a telephone as the media for $M_{11}$ 103, a personal computer as the media for $M_{12}$ 104, and a cell phone as the media for $M_{1n}$ 105. $USER_2$ 110 has an array of telephones. Access media $M_{21}$ 111 is a home phone, $M_{22}$ 112 is a business phone, and $M_{2n}$ 113 is a car phone. In similar fashion, $USER_k$ 120 has a telephone as access media $M_{k1}$ 121, a personal computer as media $M_{k2}$ 122 and is a service provider via access media $M_{kn}$.

All primary users 101 have connectivity to a Primary Service Network (PSN) 130. The PSN 130 serves as a Enhanced Telephony Service (ETS) provider. The ETS is provided using a primary CSA system 131. The primary CSA 131 includes cross connect means 134 to provide user and service connectivity and information transfer. Information is transferred between cross connected users and services called the communicating parties. Information transfer is primarily in digital form in any of a variety of protocols depending upon the needs of the parties. Analog signals can be accommodated to and from the users, as required.

Primary CSA 131 includes a user image database 142. The database 142 maintains an image of each user wherein it correlates, stores and associates the service related passwords and/or IDENTIFIERs of each user. The database 142 is regularly modified and updated to add, delete and modify particular user image data in the CSADm mapping whenever it receives information that a user's service and its respective assigned password and/or IDENTIFIER is added, deleted or changed. With implementation of the present invention, each user may input these changes from any of that user's access media. The database 142 normally includes input and output interfaces for the modalities and characteristics of the user's access media and service connections. This enables the CSA 131 upon receiving a service request from a user using any media with any stored IDENTIFIER in that user's image in one domain, to forward that request to that service provider in the domain that provider requires. The domain to domain transfer is often performed in a conversion means 132. In some cases, the domain conversion is performed by providing a temporary IDENTIFIER in a domain for which the user does not have an IDENTIFIER. The conversion means 132 also converts between the input and output protocols and media modalities required to satisfy the communicating parties. Thus $user_1$ 102 may access E-mail messages or documents from the computer 122 of $user_k$ 120 with a voice telephone $M_{11}$ 103. The conversion means converts the document into a voice message for delivery to $user_1$'s 102 telephone 103. A message or response in the other direction in the form of a voice message sent from $user_1$'s 102 telephone 103 is converted to an E-mail message or document delivered to $user_k$'s 120 personal computer 122.

The primary CSA 131 also includes a network management module 136. The management module implements all network control and monitoring, error handling, scheduling, administration and management. A billing module 138 is separated from the management module 136 as an example of the many advantages of the user image database. The billing module correlates all charges to each user, in accordance with that user's stored IDENTIFIERs, so as to develop and construct a common billing capability for all service utilizations by that user.

The CSA 131 also includes a primary services means 140 which provides all the enhanced telephony services provided internally of PSN 130. A remote service interface 150 is generally available for connecting to remote service networks. Thus, the cross service network 100 of FIG. 1 provides coordination of user service identifications and/or verifications for disparate services. It allows the array of users 101 to operate under multiple appropriate service IDENTIFIERs within the cross service domain described. Each user retains a single user image for applications which bridge the service boundaries.

The user IDENTIFIER provides a means to gain access to a service provider. Actual service provision often requires that the user enter a password for purposes of user verification. In an embodiment of the present invention, the image database also includes these verification passwords as appropriate to the service domain. In this case, once a user is identified by an IDENTIFIER and verified via one of the stored passwords, the user may use another service without entering another password for that other requested service. This is generally used when so requested by the user and upon approval of the password requiring service. Thus, for this embodiment, wherever the word IDENTIFIER is used herein, it is understood to include any password, and/or interactive sequence, and/or signals required to be provided by the service requestor to become authorized by the service provider for the requested service.

It is advantageous to assign a main IDENTIFIER, (MAIN-ID), for each user for quasi-universal identification of that user. The MAIN-ID is the most desired one to be used for all in-network and out-of-network communications with the user. The MAIN-ID may include the social security number and/or the actual name of the party responsible for billing and IDENTIFIER utilization. Each image database includes the user's MAIN-ID when it exists. It is generally made available to any service or user requesting it.

The mapping information is stored in the database using any of the database store-and-retrieve techniques known to those skilled in the art. A relational type database implementation is clearly suitable for the CSADm association purposes. In one embodiment the data is stored by means of storage, indexing and retrieval such as in a distributed database comprising multiple computers attached to a network. The database stores information sufficient to uniquely identify subscribers of each service that is associated, and to provide these subscribers access to the service. The nature of the information required is generally determined by the service providers of said services. For a particular subscriber, this information comes from the service, from the subscribers themselves and/or other sources. Data input is accomplished by various means. The means include manual and automated entry to the CSADm by system administrators, entry through a batch or transaction based update from the computer systems of the service providers or other information sources, and/or by the subscribers themselves.

The means for maintaining this database information is generally dependent upon the size and nature of the services to be associated, and the business and other objectives of the cross domain system administrator. Such means include distributed relational databases, network databases with replication, distributed file systems, relational hierarchical and network databases within a single system, databases requiring disk access per lookup, databases keeping information in high speed random access memory, and file systems within a single system.

In particular embodiments means are employed for keeping information with the appropriate level of security, reliability, availability, and performance as dictated by the CSADm service. In some cases the means to do this include redundant and distributed processing, fault tolerant hardware and/or software, fault tolerant network attachments, logging and journaling, and back out or force ahead of incomplete transactions.

In one embodiment, the database schema is selected to provide a powerful general mapping service for a dynamically variable number of services to be associated. Additional services can be associated after the association is first set up in that it is dynamically variable. Associations for a small or fixed number of services whose attributes are well known may use more limited, performance optimized approaches or ones that can be implemented in less programming steps. In general, each user is identified by that user's identification within any of the associated services. Given an identification within any service, the users IDENTIFIERs and capabilities within any of the other services can be found by the CSADm.

An embodiment of the database, uses data structures that include a service user IDENTIFIER table, a user service record, and a cross domain user service record There is a separate service user IDENTIFIER table for each service. Each table is indexed by the way the user is known within that service. This may be via that user's MAIN IDENTIFIER or a specific IDENTIFIER assigned by that service. The table provides a pointer to the user service record for that service. This record provides information of how that service can be accessed and operated on behalf of that user. This often requires that user's service IDENTIFIER and password, as well as the capabilities that the service is willing to perform on behalf of that user. Since many of the users have the same capabilities, these records could be stored in a normalized format to minimize the amount of common information that is replicated.

For each user service with cross service functionality there is a chain or doubly linked list of all that user's service records. As previously stated, each user has a user service record for each service to which that user has access. These records normally result from long term service subscription, or are dynamically created as the result of accessing a transaction based service. If not otherwise available, a user is assigned a service IDENTIFIER for temporary use from a pool. These records contain forward and back pointers to the user's other user service records in a doubly linked list forming a chain. When an association with a new service is made for that user, a new service user IDENTIFIER is created along with a new user service record which is linked into this chain to form the service association. In this manner, all the services associated with each particular user indicating that user's access and operating rights are found.

Thus, the cross domain user service record specifies information on the operation of the cross domain service for each user. For example, if the service is an interworking between an internet based service and a voice based telephony service, it is often necessary to choose which of the services that user has associated with telephony, such as wireline and wireless, should be used. This information is pointed to by all the user service records for rapid access in providing cross services. The cross service provider often chooses to keep this information within its own data facility. In this case, the information is either stored within the CSADm redundantly, or this function is not used at all.

Figure 2:
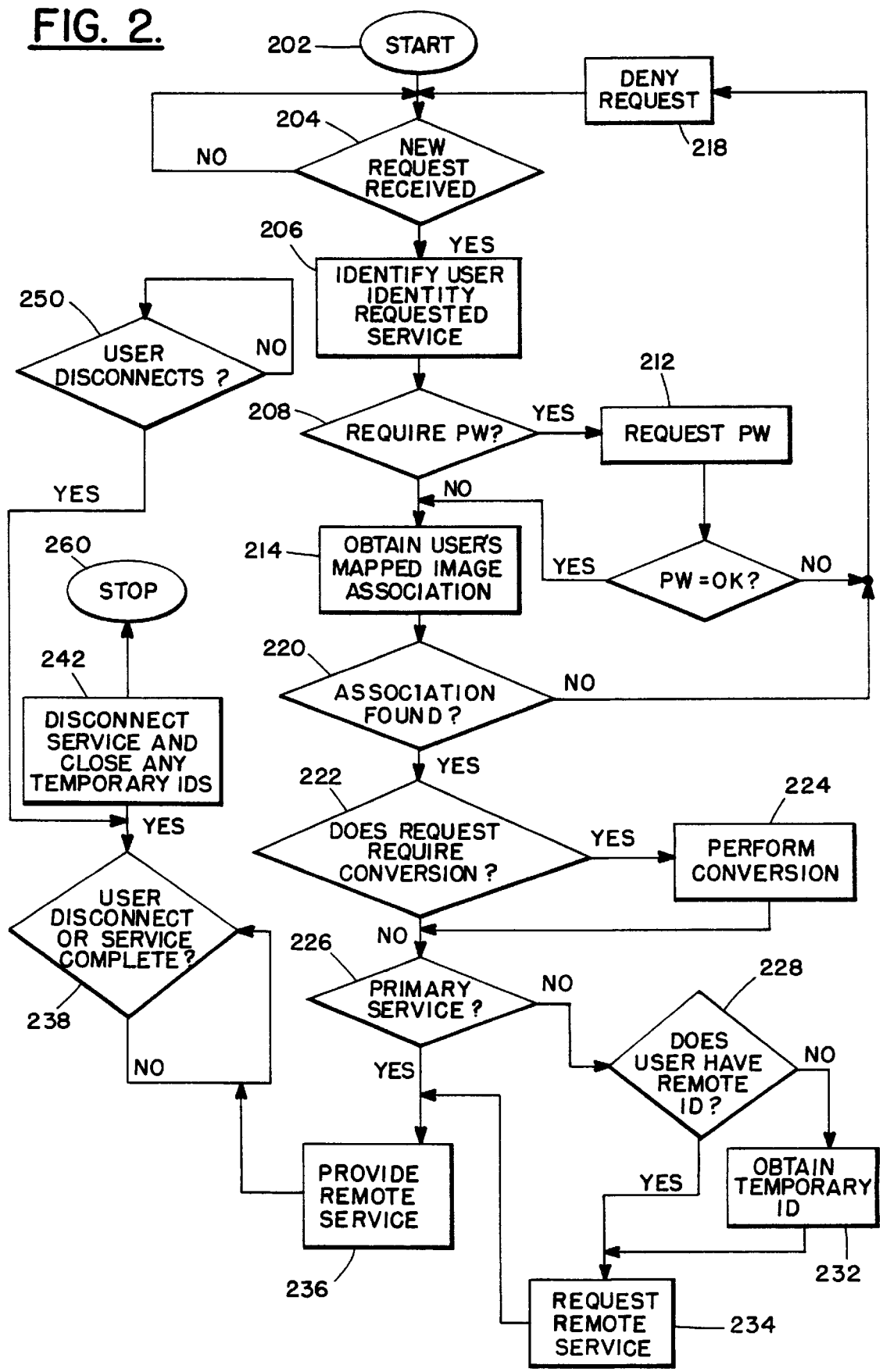
FIG. 2 shows a flow diagram of an operational sequence for the Cross Service Association Domain mapping system in accordance with the present invention.

A flow diagram of an operational sequence for a cross domain association mapping of the present invention is shown in FIG. 2. It shows a group of steps used to obtain the IDENTIFIER association for $USER_1$ with a received identification of ID='A', for a service that recognizes only a $USER_1$ identification of ID='A-prime'. Operation commences in the 'start' block 202. The CSA, 131 in FIG. 1, awaits a request for service from a primary user, block 204. Upon receiving a request from a user block 206, with ID='A', the CSA identifies the request to come from $USER_1$. The CSA examines the request to see if it is such for which a password is required, block 208. If a password is required a password is requested, block 212. If the password is received and verified the password=OK is activated, block 216. If password is wrong and/or times out, the request is denied, block 218.

If password=OK or no password is required, the CSA 131 requests an IDENTIFIER association for $USER_1$ with ID='A', block 214. If an association is not found for the requested service, block 220, then the request is denied, block 218. If an association is found, block 220, the CSA 131 determines if a domain or protocol conversion is required to satisfy the request, block 222. If a conversion is required, the conversion is performed in the conversion means, 132 of FIG. 1.

When the conversion is complete, block 224, or if a conversion is not required, the CSA determines if the requested service is a primary service provided by the CSA's primary service means, 140 FIG. 1, block 226. If the request is not for a primary service but for a remote service, the CSA 131 searches the CSADm database, 142 FIG. 1, for the image of $USER_1$ to determine if $USER_1$ has an IDENTIFIER and/or password for the remote service, block 228. If $USER_1$ does not have the required access identification for the remote service, the CSA 131 requests and receives a temporary ID, ID='A-prime', for this request, via its remote service interface, 150 FIG. 1, block 232. The CSA 131 then requests the remote service to be granted for ID='A-prime', block 234. The requested primary or remote service access is provided, block 236.

When the service is completed, block 238, the service connection is terminated and any temporary identification is closed, block 242. The CSA reverts back to await another request from $USER_1$ or any other user, block 204. At any time that $USER_1$ hangs-up, block 238, or a service disconnection is sensed, block 250, a service override causes the connection to be reset by going into block 242.

The above schema is generally employed by the PSN, 130 of FIG. 1, in usually asynchronous and quasi-simultaneous fashion for a multiplicity of requests from its connected primary users, 101 of FIG. 1, The PSN 130 also satisfies any requests it receives via its remote service interface, 150 of FIG. 1. Once a user hangs up to disconnect the accessing line, often following a predetermined delay, the service is disconnected and any temporary IDENTIFIERs are closed, block 242, and the operation is stopped, block 260.

Figure 3:
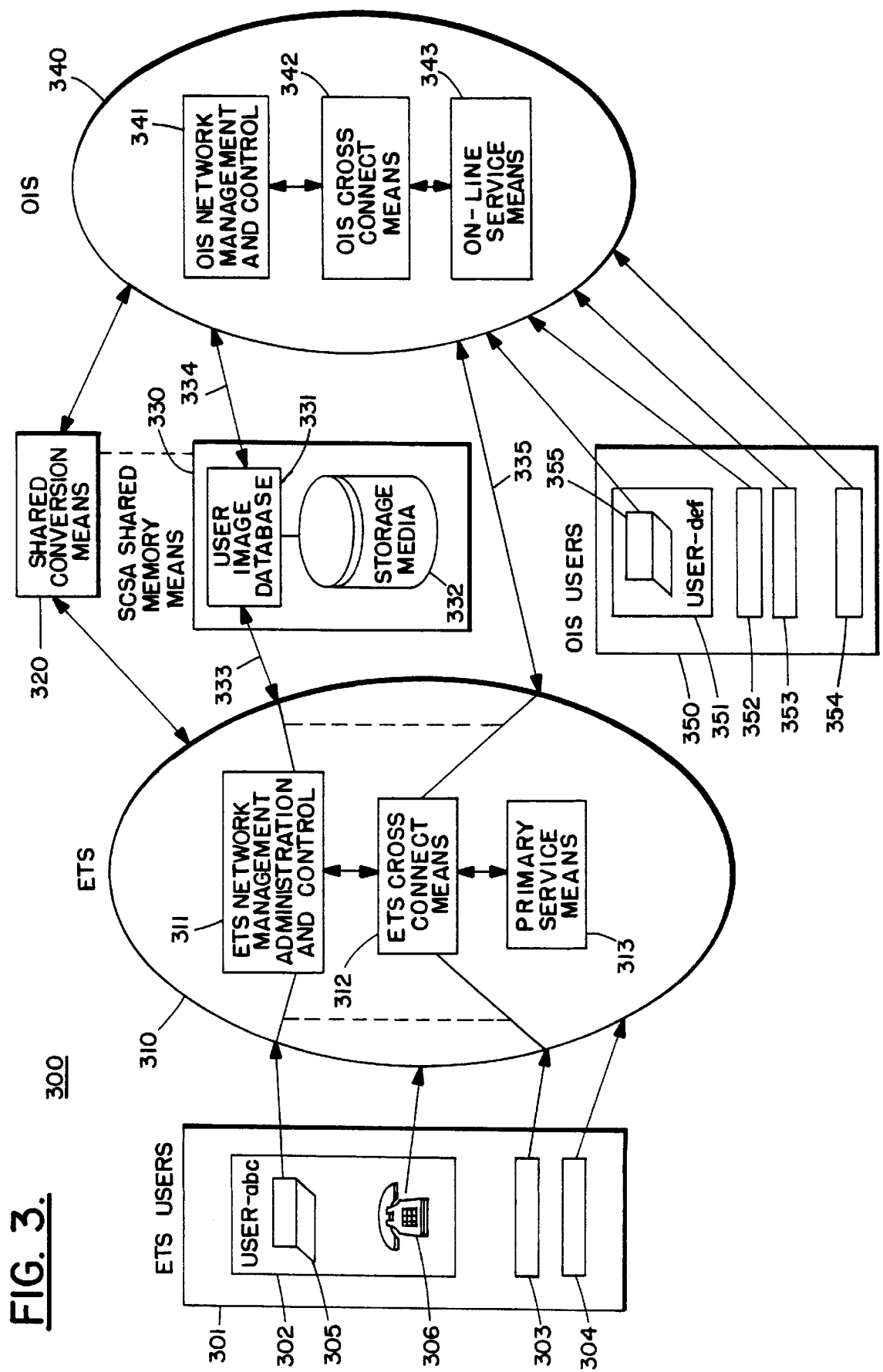
FIG. 3 shows an embodiment of a coordination of disparate services in accordance with the present invention.

An embodiment of the coordination of disparate services in accordance with the present invention is shown in FIG. 3. It shows a network 300 with two service network entities. One network entity is an Enhanced Telephony Service (ETS) 310 network. The ETS 310 includes a cross connect means 342, a management administration and control means 341, and a primary service provision means 313. The other entity is an On-line Information Service (OIS) 340 network. The OIS 340 includes a cross connect means 342, a management, administration and control means 341, and an on-line service means 343. A group of ETS attached users 301 have direct connectivity to the ETS network 310. ETS users 301 include users 302–304. In like fashion another group of users, OIS users 350 have direct connectivity to the OIS network 310. OIS users 350 include users 351–354. The ETS and OIS networks are interconnected through coupling 335 through which information is exchanged. The two networks have independent connectivity through couplings 333–334 to a Shared Cross Service Association, SCSA 330. The SCSA 330 contains the user mapping of both the ETS attached users 301 and the OIS attached users 350 in a user image database CSADm w331 stored in storage media 332. The mapping correlates all the identification and verification IDENTIFIERs and passwords of both the ETS users 301 and OIS users 350. This enables each user to operate within the Cross Service Domain under multiple appropriate service IDENTIFIERs and to retain a single user image for applications which bridge the service boundaries.

In the embodiment of FIG. 3 both the ETS 310 and OIS 340 networks have access to the user image database CSADm 331. In an alternate embodiment, rather than being shared, the entire user mapping is resident separately in both the ETS 310 and the OIS 340 networks. These embodiments represent different degrees of centralized system CSADm implementations in which each network has access to the entire user image mappings. Thus, although only one network entity is responsible for generating and providing the user's common bill and/or any connectivity maintenance, the CSADm provides user image data to other entities. This enables the other entities to share and use the CSADm contents for identifying and/or verifying a user by any of that user's image entries in a variety of domains and formats. Other network assets such as the conversion means may be similarly shared. In one embodiment, these other entities are also provided with rights to add, delete and modify user image data from the CSADm mapping. An entity normally only modifies image data associated with itself and/or upon the user's verified request.

In an alternate implementation of the present invention, each network entity only maps the user images of users which have direct connectivity. This is most generally employed in a distributed system implementation of the invention. In this situation the ETS 310 includes the database mapping of only the family of users referred to as ETS users 301. The OIS includes the database mapping of only the family of users referred to as OIS users 350. In this way the user's image is resident only in the network entity which is responsible for generating and providing the user's common bill and/or any connectivity maintenance.

In both the distributed and centralized implementations, some users may still find advantage or necessity to have direct connectivity to more than one network entity. A large network generally implements a combination of distributed and centralized implementations. Generally, in large networks some entities will have a mapping of a large subset or the entire user population, other entities will have a mapping of only directly connected users, while still other entities may not be adapted to make use of the CSADm database.

In any of these embodiments, use of the CSADm user image mapping provides for the coordination of the disparate ETS 310 and OIS 340 services as described in the following example. Referring back to FIG. 3, USER$_{abc}$ 302 is a subscriber to the enhanced telephony service ETS 310, and is known by telephone 306 as telephone number ID='C' and by computer 305 ID='C-prime'. When USER$_{abc}$ wishes to use an application available on the online information service OIS 340, it makes an OIS 340 service request using telephone 306 for service to be provided to the computer 305. In response to the request, the ETS 310 requests and receives an IDENTIFIER association for USER$_{abc}$ from the SCSA 330. The SCSA 330 returns an ID='C-prime' corresponding to the computer 305 in the domain requirement of the OIS 340. The ETS 310 forwards the service request with the associated IDENTIFIER of ID='C-prime' to the OIS 340. The OIS 340 responds by providing the requested service to USER$_{abc}$ under ID='C-prime'. If the association is still available to the ETS 310, the response is forwarded to computer 305 with telephone number ID='C-prime'. If the request is for a deferred time, the association may not be available when the OIS 340 service for USER$_{abc}$ under ID='C-prime' starts to be provided. If the association is not available, a new request is made to the SCSA 330 for an IDENTIFIER association of ID='C-prime'. The association results in ID='C'. The service is then forwarded to USER$_{abc}$ under ID='C-prime'. If the association depends on the time of day, or other variable, a new association is generally requested, allowing the service response to be delivered over the most desired path.

A similar routine is followed when an OIS user 350 requests a connection to an ETS user 301 with only the knowledge of the ETS user's telephone ID='C'. In this case, when OIS 340 USER$_{def}$ 351 makes a request to direst a data transmission to USER$_{abc}$ under ID='C', the OIS 340 requests and receives an association of this ID='C' from the SCSA 330, via link 334. The SCSA 333 responds with the association to USER$_{abc}$ as ID='C-prime' and causes the data transmission to be routed to USER$_{abc}$'s computer 30, having an ID='C-prime'. Alternatively, if a telephone connection is requested with the OIS user only knowing USER$_{abc}$'s computer ID='C-prime', OIS 340 forwards the transmission to 'C-prime' in the ETS 310. The ETS 310 then requests the association of ID='C-prime' and receive an association to USER$_{abc}$ ID='C'. The ETS 310 then forwards the transmission to USER$_{abc}$'s telephone 306 having ID='C'.

In still another embodiment the entity shown as the OIS network 340 has enhanced telephony service network capabilities and characteristics similar to the ETS 310. The ETS 310 and the OIS 340 may be operating in different geographic areas with different names but having like capabilities. The ETS 310 may be one regional operating company or subset thereof. The OIS 340 may be a second regional operating company or subset thereof. In this situation each regional operating company, or its subset, maps and handles all its own directly connected customers.

The present invention is also advantageous to service support applications such as: common billing customer service, problem reporting; service registration; and service provisioning. The CSADm provides a user association means so that its users can receive common billing for enhanced telephony services, Internet access services, electronic commerce service and on-line information services. Detail billing records transmitted to the CSADm supplier are associated with each common user via the CSADm to enable single billing for each common user. This is done in traditional fashion or through real-time on-line or IVR demand techniques.

Figure 4:
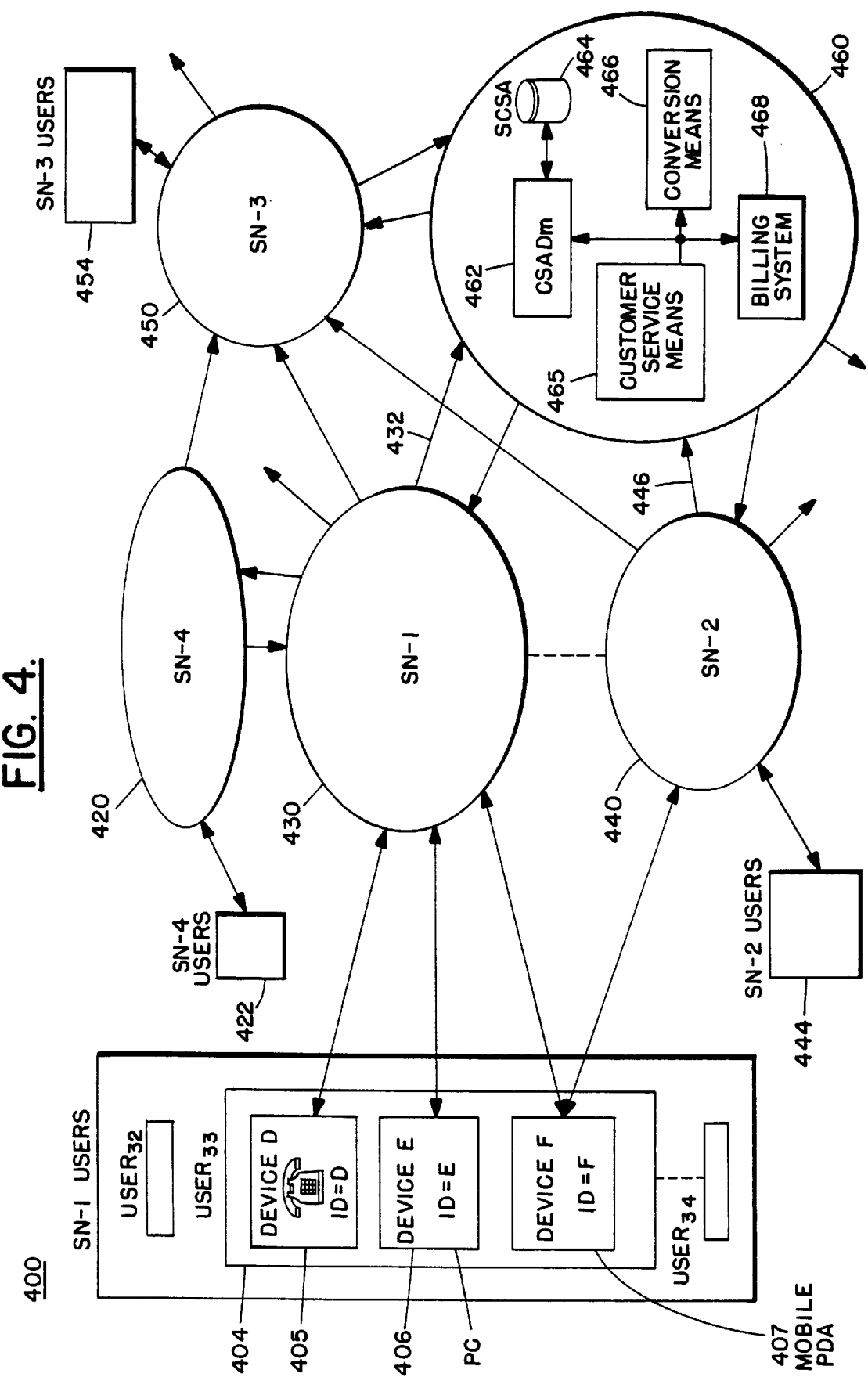
FIG. 4 shows an embodiment of the present invention which provides common customer servicing for a plurality of network entities.

An embodiment providing common customer servicing for a plurality of network entities is shown in FIG. 4. FIG. 4 shows three service networks SN-1 430, SN-2 440, SN-3 450, and SN-4 420. The three networks are provided common customer servicing by a Shared Cross Service Association (SCSA) provider 460. SCSA 460 includes a CSADm 462, a conversion means 466, a customer service and maintenance control means 465, a common billing system 468, and a storage means 464. Each service network has its own directly connected user family. Network SN-1 430 serves SN-1 users 402. Network SN-2 440 serves SN-2 users 444. SN-3 users 454 are served by network SN-3 450, and Network SN-4 420 serves SN-4 users 422. Some users may indeed have direct connectivity with one or more network entities through one or more of their access media. Network SN-4 420 has no direct connectivity to the SCSA 460. This may be because of the specialized nature of network SN-4 420. It may be due to lack of adaptation to, or cooperation with, the common sharing of the SCSA 460 provisions. Normally, all the four service networks have either direct or indirect connectivity with each other. SCSA 460 has a user image map for each user in the user families of SN-1 430, SN-2 440, and SN-3 450. Upon receiving a request from a network, SCSA 460 uses the mapping to make available to that network the cross service IDENTIFIER and password associations for a user. The association results in the provision of the pass-through and/or access IDENTIFIER or IDENTIFIERs for a requested service to be requested from, and then provided by, the providing service.

Pass-through is required when the network to which the user is directly connected does not have direct connectivity to the service provider or is used when it provides the shortest, least expensive and/or technic operation advantages. The IDENTIFIERs are given in the domain and protocols required by that service provider. Any required conversions are performed by conversion means 466.

Consider $USER_{33}$ 404 from among the SN-1 users 402. $USER_{33}$ 404 uses three devices D 405, E 406, and F 407, to access desired services. Device-D 405 is a POTS telephone to access SN-1 with an IDENTIFIER of telephone number ID='D'. A personal computer, device-E 406, is also connected to SN-1 430 and is used to access enhanced telephone services with an IDENTIFIER of telephone number ID='E'. Device-F 407 is a mobile PDA with connectivity to both SN-1 and SN-2, with an ID='$F_1$' for SN-1 and an ID='$F_2$' for SN=2.

Following a service provision to $USER_{33}$ 404 by SN-2 440 SN-2 sends a billing detail record to the SCSA 460 on-line 446. When USER-33 404 is provided a service from SN-1 430 through device D 406, E 407 or F 408, SN-1 sends a billing detail record to the SCSA 460 on-line 432. Both of these records are associated with the same end user, $USER_{33}$ 404, and the data is sent to that user's billing file in the common billing system 468. The data may be used to generate paper bills, camera ready copy for paper bills, or may be returned to the storage mean 464 for storage. The CSADm associates the received billing information with the appropriate user ID='F', or preferably $USER_{33}$'s MAIN-ID. As a result of the association, the SCSA 460 makes the billing information available to the entity to which $USER_{33}$ has direct connectivity, SN-1 430. At SN-1's 430 customer billing cycle, $USER_{33}$'s bill is supplied to the end user, namely $USER_{33}$ 404. Billing information may also be associated with the appropriate SN-2 ID=$F_2$ and made available to SN-2 to be supplied to the end user, namely $USER_{33}$ 404.

Heretofore cross service end user interfaces to enhanced telephony services such as call forwarding and voice mail have been mainly through the phone. The phone was the only or the primary telephony end user interface. The command and control available to the end user was limited to a command-set easily accessible via the phone. It was primarily based on the ability of end users to key-in DTMF tones on voice prompts, and later was enhanced to allow user voice responses.

Use of the CSADm of the present invention allows service providers to enable computer ETS interfaces for telephony functions. In one example, implementing of the CSADm allows an end user to interrogate and modify telephony functions with all advantages of a graphic computerized user interface. These functions include call forwarding and follow-me universal phone number selection lists. This enables an increasing array of available user directed and/ implemented commands. For example, it enables a small business owner to use a PC application to direct the telephone network to automatically route telephone calls to a home number after close of business. Enhanced services such are these are presently modified only by skilled telephone company operators. Using the cross service technique of the present invention, service selections are examined much like software configuration data via a PC-like screen. This provides a two dimensional graphic ETS user interface to what has traditionally been a one- dimensional serial data input and output readout. A third dimension, namely time and/or duration of service modification, is also easily made available to the ETS user. This service enhancement has great value to voice subscribers. It allows them to employ a friendly GUI to modify, verify, and control their enhanced telephony services via access through the Internet, or a telephone company service provider dial-in port.

Figure 5:
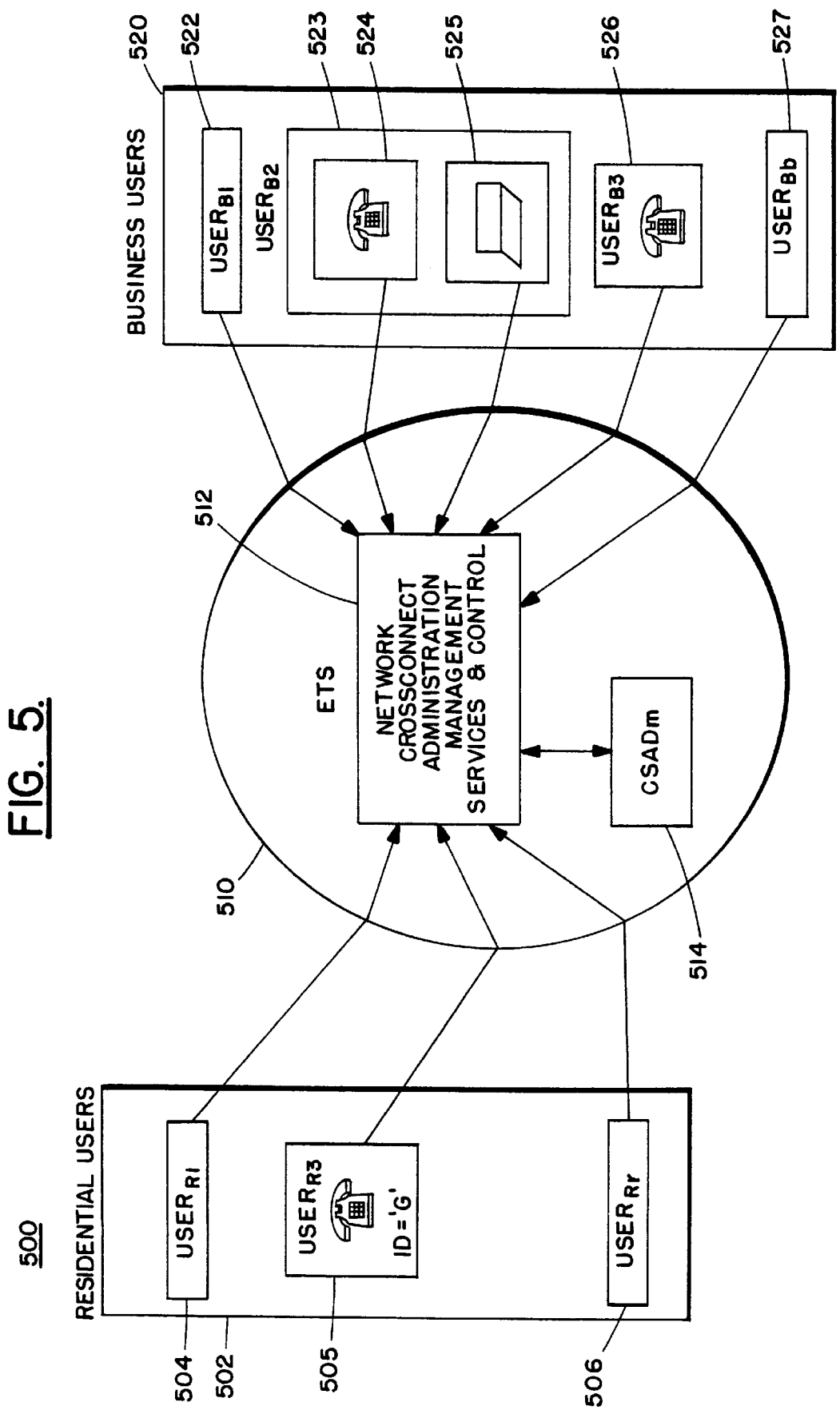
FIG. 5 shows an example for a cross service user interface in accordance with the present invention.

An embodiment of a cross service user interface is shown in FIG. 5. FIG. 5 shows a service network 500 which provides Enhanced Telephony Services, ETS 510, to 'r' residential users 502, $USER_{R1}$ 504 to $USER_{Rr}$ 506, and to 'b' business users 520, $USER_{B1}$ 522 to $USER_{Bb}$ 527. The ETS 510 includes a network cross-connect and control 512 which provides all network functions other than the cross service association domain mappings. The cross service association domain mapping is provided by CSADm 514. Residential users 502 includes $USER_{R1}$ 504, $USER_{R2}$ 505, and $USER_{Rr}$ 506. $USER_{R2}$ has ETS 510 connectivity via a residential phone 505 with phone number ID='$G_{R-TEL}$'. Business users 520 include $USER_{B1}$ 522, $USER_{B2}$ 523, $USER_{B3}$ 526, and $USER_{Bb}$ 527. Business $USER_{B2}$ 523 has direct connectivity to the ETS 512 through both a telephone 524 with telephone number of ID='$G_{BT}$' and a personal computer 526 with an ID='$G_{BP}$'.

CSADm 514 associates for a common image, the residential telephone 505 with the business telephone 524 and with the personal computer 526. This essentially associates residential $USER_{R2}$ with business $USER_{B2}$ as a common user with three ETS connections, two telephones 505, 524 and a personal computer 525.

The association allows the common user to use and make modifications to the use of any of these three ETS connections from any of the other two connections. In FIG. 5, $USER_{B2}$ is a small business which responds to business customer calls to telephone number '$G_{B-TEL}$' at a business telephone 524 during the hours between 9:00 AM and 6:00 PM of each day. The ETS is firstly set to route calls to telephone number '$G_{B-TEL}$' between 6:00 PM in the evening and 9:00 AM of the following day to this common user's residential phone 505 with telephone number '$G_{R-TEL}$'. With the common image association of the CSADm 514, this common user may use the PC 525 to change the time of routing business calls to the residential phone. Through the PC 525, with ID='$G_{B-PC}$', the small business owner connects to the ETS 510 and requests to make a change in its time based call routing control. The ETS network 512 requests an association of ID='$G_{B-PC}$' from the CSADm and receives the response that '$G_{B-PC}$' is associated with '$G_{B-TEL}$' and '$G_{R-TEL}$'. User profile information is retrieved for this common user, $USER_{B2}$, and a graphic user interface is presented to allow $USER_{B2}$ to request a change using PC 525. In this case, the change is to route calls to the residential phone between the hours of 5:00 PM and 9:00 AM rather than between the hours of 6:00 PM to 9:00 AM previously set. Following this user directed change, when customer USER$_{B3}$ 526 calls telephone number ID='G$_{B-TEL}$' at 5:15 PM, which is after the new effective time of routing business phone directed calls to the residential phone, the call is routed to telephone ID='G$_{R-TEL}$'.

Figure 6:
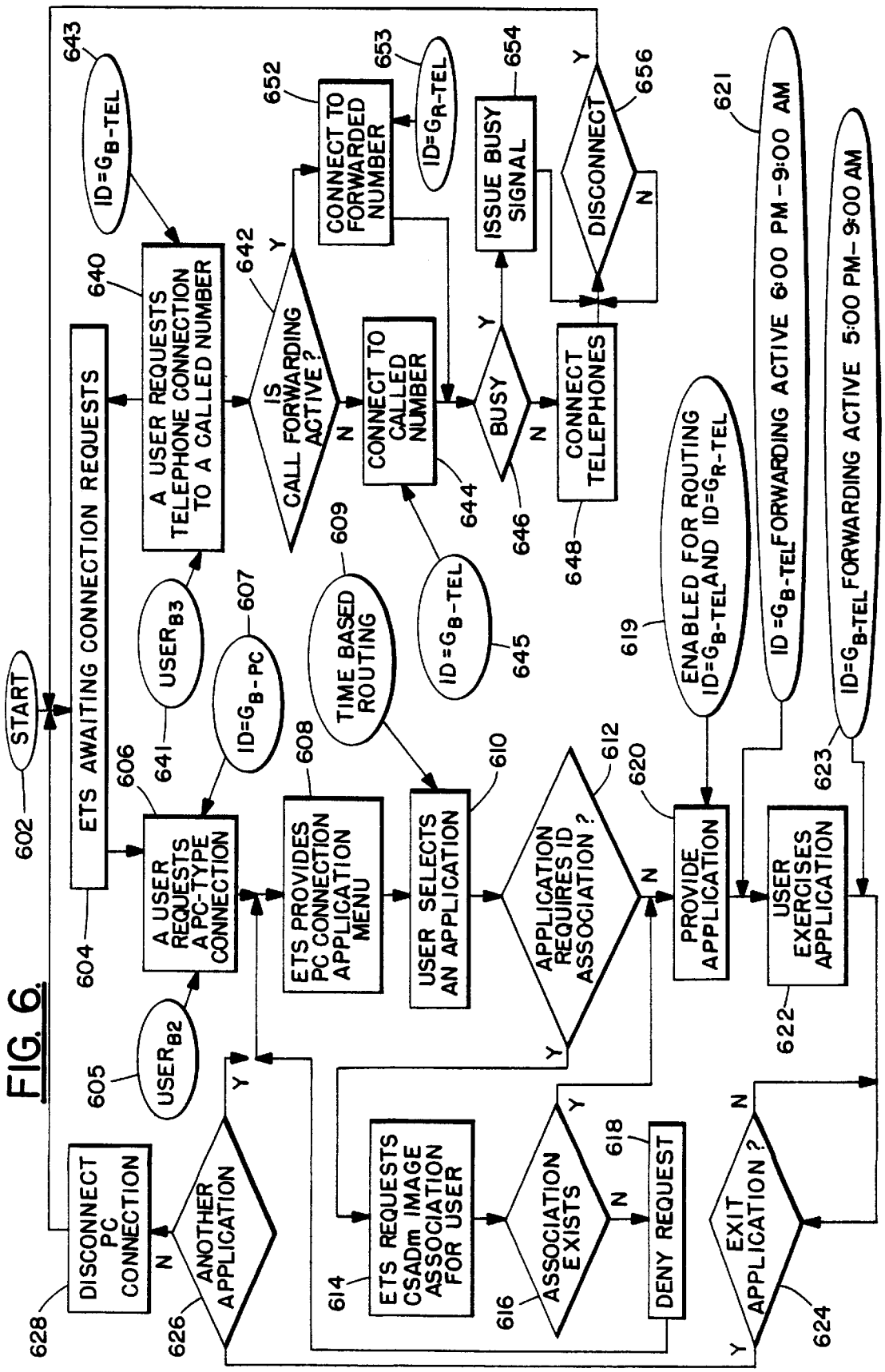
FIG. 6 shows a flow diagram for an embodiment of the cross service user interface.

A flow diagram 600 of an embodiment of the cross service user interface of FIG. 5, is shown in FIG. 6. FIG. 6 shows an example of the steps involved in enabling a user to use that user's personal computer to change that user's telephone service parameters. In the example shown, USER$_{B2}$ 523 uses USER$_{B2}$'s PC 525 to change the time of forwarding phone calls directed to USER$_{B2}$'s business phone 524 to USER$_{B2}$'s residential phone 505. This is enabled by the present invention in that the CSADm image for USER$_{B2}$ 523, associates USER$_{B2}$ 523, USER$_{R2}$ 505 and IDENTIFI-ERs of ID='G$_{B-TEL}$', ID='G$_{R-TEL}$' and ID='G$_{B-PC}$'.

The following description is best understood by referring to both FIGS. 5 and 6. The steps involved in the operation of the cross service user interface of FIG. 5, are shown in FIG. 6. Included with the flow block diagram 600 are the specifics of the example chosen. These specifics are each included within an ellipse. Operation commences at the start block 602. The ETS 512 awaits a user connection request, block 604. USER$_{B2}$ (ellipse 605) makes a request for a PC-type connection from PC 525 having an ID=G$_{B-PC}$, (ellipse 607) block 606. The ETS 510 responds by furnishing the requested PC-type connection to the PC 525 by providing a menu of applications, block 608.

USER$_{B2}$ 605 selects the application for time-based routing (ellipse 609). The ETS determines if the application requires IDENTIFIER association, block 612. The time-based routing application does indeed require IDENTIFIER association, block 614. If an association does not exist, block 616, the request is denied, block 618, and the PC-connection is again furnished the application menu, block 608. If the association exists, block 616, or an association is not required, the application is furnished, block 620. The application is enabled for USER$_{B2}$ 605 to modify the routing for the resulting associated IDENTIFIERs of ID=G$_{B-TEL}$ and ID=G$_{R-TEL}$ (ellipse 619).

For the example described above, the routing control for call forwarding of calls to business telephone 523 is initially set to activate call forwarding to residential telephone 505 between the hours of 6:00 PM and 9:00 AM (ellipse 621). USER$_{B2}$ exercises the time based routing application, block 622, to activate the call forwarding between the hours of 5:00 PM and 9:00 AM. Once this change is implemented any call directed to telephone with ID=G$_{B-TEL}$ between the hours of 5:00 PM and 9:00 PM is forwarded to the telephone with ID=G$_{R-TEL}$ (ellipse 623).

When USER$_{B2}$ exits this application, block 624, the ETS determines if USER$_{B2}$ wants to exercise another application, block 626. If not the ETS discontinues the connection with the PC 525, block 628, and goes back to await another user connection request, block 604. If USER$_{B2}$ wants to exercise another application 626, the PC 525 is then furnished the application menu, block 608. When the ETS receives a connection request for a telephone connection, block 640, from USER$_{B3}$ (ellipse 641) calling telephone with telephone number ID=G$_{B-TEL}$ (ellipse 643) it determines if call forwarding is active, block 642. If the call is made when call forwarding is not activated, the telephone connection is directed to the called number ID=G$_{B-TEL}$, (ellipse 645), block 644. If the call is made at a time when call forwarding is activated, the call is directed, block 652, to the forwarding number ID=G$_{R-TEL}$ (ellipse 653). The ETS determines if the phone to which the call is directed is busy, block 654. If it is not busy, the telephone connection is established, block 648. When USER$_{B3}$ hangs-up, the telephone connection is disconnected, block 656 and the ETS awaits another request from USER$_{B3}$ block 604. The interactive sequence of steps described with the aid of FIG. 6 for USER$_{B2}$ and USER$_{B3}$ are typical for the ETS quasi-simultaneous servicing of a multiplicity of similar and non-similar ETS connected users.

Although the example is for a common user to modify telephone routing via a PC, it is similarly operational between any other network connected medium types, using any network accepted modality, to perform any accessible function for any application available to that common user. Thus, a user can modify a computer's connection parameters, such as baud rate and parity, from that user's telephone or from a second, often remote, computer.

In one embodiment, the user can perform parameter modifications to an owned connection medium, from a remote access medium that is not owned by that user. This is accomplished by the user identifying himself and verifying himself with a password. Furthermore, the modifications are made even when the remote access medium operates in one modality, e.g. voice, and the medium connection to be modified operates in an other modality, e.g. data and/or still or motion video.

The steps of FIG. 6 may also be followed when a request is received by the ETS from a remote user with which the ETS does not have direct connectivity. This is most feasible when that remote user's image is in an ETS local CSADm. It is also viable when a non-local CSADM contains that remote user's image and is available to the ETS. This technique is similarly adaptable for use with a shared CSADm.

It is noted that the request denial in FIG. 6 block 612, is useful whenever the user lacks rights and/or assets for exercising a particular application. This is an ETS response behavior mode useable for any application request made by a user for which the user is not enabled, and/or which is inappropriate to that user's image in the CSADm. This is the case for example if a user image shows only a single phone connection, and/or that user is without call-forwarding privileges. It generally does not allow a user to modify or cause forwarding of calls directed to a phone for which the user is not the system recognized owner. It may however not preclude the ability of a user to redirect calls directed to a phone that it does own, to a phone which it does not own. Request denial is sometimes due to the unavailability of equipment required to satisfy a request.

In some embodiments the ETS provides modality conversion such as voice to and from document, via an available conversion means. The ETS does not normally provide a user's service request for a service between a user-owned medium and a non-user owned medium, if the owner of the owned medium does not have conversion means privileges. In the alternative, the owner of the non-user owned medium may subsidize use of the conversion means for callers to the non-user owned medium.

The present invention is similarly used to advantage to enable service media transformations. These result in services that employ continually developing advancements in technologies such as speech recognition and speech synthesis that feature the requisite media transformations. Use of the CSADm allows these services to use the most appropriate network functions to communicate with an end user. For example, when a voice mail message is received which is targeted to an end user by a telephone number, speech recognition is used to transform the message to text. The text is available to be sent to one or more on-line E-mail services for end user examination. The message may be directed to particular CSADm IDENTIFIERs based on a message's header, keyword, content and/or address list in accordance with CSADm supplied appropriate IDENTIFIERs.

Figure 7:
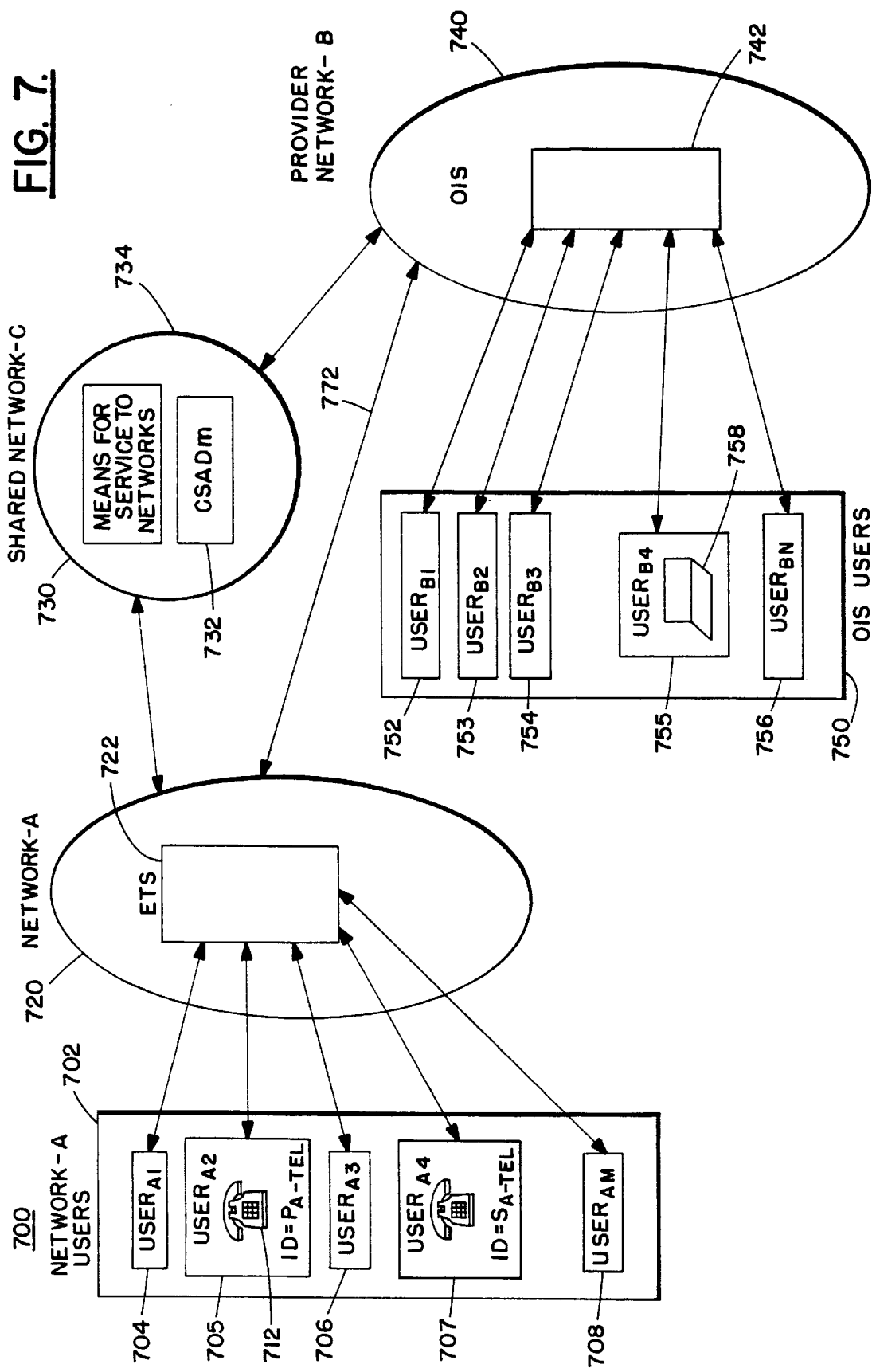
FIG. 7 shows an embodiment of the present invention for service media transformations.

An embodiment of the invention for service media transformations is shown in FIG. 7. FIG. 7 shows a multiple network entity configuration 700. Three entities are shown. One entity is Service Network-A 720 which includes ETS 722. There are 'M' Service Network-A users 702, ranging from $USER_{A1}$ to user $USER_{AM}$ 704–708. These users are primarily regular DS-0 telephone line utilizers. A second entity is Provider Network-B 740. Provider Network-B 740 includes an on-line information service, OIS 742. It has 'N' OIS users 750, ranging from $USER_{B1}$, to $USER_{BN}$ 752–756. These users are primarily computer users, and have direct connectivity to the OIS 742 through an assortment of connection bandwidths OIS 742 user connectivity generally includes a plurality of DS-0, DS-1, DS-3, T1 and ISDN connections. A third entity is the Shared Network-C 730. Shared Network-C 730 includes a shared CSADm 732 which is shared by all participating entities. Service Network-A 720 and Provider Network-B 740 are participating entities.

The CSADm 732 includes user IDENTIFIER image information which provides a basis for associating a common user with that user's various connectivities to both Service Network-A 720 and Provider Network-B 740. It associates ETS 722 $USER_{A2}$ 705 with OIS 742 $USER_{B4}$ 755. $USER_{A2}$ 705 has telephone connectivity via telephone 712 having an ID=‘$P_{A\text{-}TEL}$’ with the ETS 722. $USER_{B4}$ has computer connectivity to OIS 742 via a laptop computer 758 with ID=‘$P_{B\text{-}PC}$’.

When the telephone 712 of $USER_{A2}$ 705 is busy, $USER_{A4}$ 707 calling on telephone 714 with ID=‘$S_{A\text{-}TEL}$’ attempts but fails to reach $USER_{A2}$ 705 for a telephone voice conversation. Since voicemail is an ETS 722 offered service, $USER_{A4}$ 707 then elects to send a voice mail message to $USER_{A2}$ 705. Upon receiving the voice mail message, the ETS 722 uses its means for media transformation to convert the voice mail message to text via speech recognition. The ETS 722 requests an IDENTIFIER association for the message target telephone, ID=‘$P_{A\text{-}TEL}$’, from the CSADm 732 in the Shared Network-C 730. It receives an association to laptop computer 758 with an ID=‘$P_{B\text{-}PC}$’ connected through Provider Network-B 740. The ETS 722 forwards the text message to OIS 742 on inter-network communications link 772 to be routed to laptop computer 758 with ID=‘$P_{B\text{-}PC}$’. In one embodiment the original voice mail message is stored in ETS 722 for access and retrieval by $USER_{A2}$ through telephone 712. In another embodiment $USER_{A2}$ may retrieve the stored voice mail from any telephone via $USER_{A2}$'s ID=‘$P_{A\text{-}TEL}$’ and a password. This provides continued access to the original voice mail information subtleties contained in the stored voice mail message replica, which are not suitable or lost when the message is transformed into text. This pertains to voice modality specific objects such as a music clip and/or emotional context.

In still another embodiment each user may use that user's MAIN-ID from any access media, and from any access point, to access any voice or electronic mail message directed to that user. In the alternative each user accesses any network that is interconnected with the Shared Network-C 730 with a medium and IDENTIFIER appropriate to that accessed network. The Shared Network-C 730 provides that accessed network with the CSADm IDENTIFIER associations of that user. This association allows that user to access and upon verification to use, listen and/or view any message or service accessible to any of the associated IDENTIFIERs.

Use of on-demand ETS provided transformation means for converting voice to and from a document enables a telephone user to have on-demand access to PC style features through an array of equipment recognized voice commands. Users who either lack access to a personal computer, or just prefer a telephone, may receive e-mail via voice appropriate navigation commands. These types of transformation techniques used with the present invention enables the granting of service delivery to a wide population of users. This includes users with very limited devices and/or network connections.

As described above, the Shared Network-C 730 provides the accessing network with the CSADm IDENTIFIER associations of each user. This association allows that user to use, listen or view any message or service accessible to any of the associated IDENTIFIERs. This is just one utilization of the Shared Network-C 730.

It is noted that the Shared Network-C 730, which includes the CSADm 732, is connected to a plurality of user servicing networks. As such the Shared Network-C 730 is basically a provider of services to other entities. Each such entity is usually a multiple user connecting network. The Shared Network-C 730 is therefore a prime locale for performing any of many entity functions which are commonly required by a plurality of its connected entities. In one embodiment, the Shared Network-C 730 includes a special service means to provide special services to networks 734. This special service means 734 includes an array of network servicing means besides the separately shown CSADm 732. Many network appropriate services result from the Shared Network-C's 730 having a CSADm 732 shared by other entities.

One of the available services of the special servicing means 734 is a shared common protocol and conversion system described previously. Another is the shared common billing system. A shared common billing system requires that the Shared Network-C 730 be made aware of user transactions and their cost. These may include only usages which require IDENTIFIER association or even utilizations that do not. The Shared Network-C 730 forwards this data periodically and/or on-demand to each common user an/or to each common user's main provider. The main provider uses the data for sending a single bill for all that common user's utilizations. This billing data may be used to enable a user and/or a service provider to set a maximum billing limit. The billing limit may be set to be a maximum dollar limit, or as is more usual, to limit the expenditure over a particular time period. The time period is usually for a month, but it can set to be daily, weekly or any combination of these.

Another resulting special servicing means 734 service is formation of a database of service utilization habits of each CSADm common user. The database may provide information tracking the types and/or number of a common user's usages, and/or the frequency and population of users of particular servicing networks service provisions. Databases may be formed that are useful for advertising and/or to determine which user may be a candidate for an additional or enhanced service. The database can be used to identify good credit and/or bad credit users. This may be based upon user bill payment history. The database may be used to make surveys and/or special offers etc.

A flow diagram for a utilization of the service media transformation of FIG. 7 is shown in FIG. 8. FIG. 8 shows an embodiment of the steps to provide the transformed information commencing from the start block 802. In the next step, the ETS awaits a telephone connection request, block 804. It receive a request from USER$_{A2}$ for a random usage, block 806. USER$_{A2}$ is granted the telephone connection, block 808, and becomes busy, block 810. When USER$_{A2}$ completes the random usage and is no longer busy, the telephone connection is disconnected, block 814, and the usage is stopped, block 820. During this time caller USER$_{A4}$ requests a telephone connection to USER$_{A2}$ with ID='PA$_{TEL}$', block 822. The ETS determines if the called party, USER$_{A2}$, is busy, block 824. If the called party is not busy the telephone connection to USER$_{A2}$ is made, block 826. If USER$_{A2}$ is busy, block 824, USER$_{A4}$ is offered an option to send a voice mail message to USER$_{A2}$, block 828. If voice mail is desired, then USER$_{A4}$ records a voice message, block 830. The message is stored, block 832, and USER$_{A2}$ is disconnected, block 816. The ETS requests a user image association of a computer connection for the called party, USER$_{A2}$ with ID=P$_{A-TEL}$, from Shared Network-C 730, block 740. The CSADm 732 reports the existence of a computer association for USER$_{A2}$ ID=P$_{B-PC}$, block 842. If no association exists the request is denied and the action is stopped, block 844. If the computer association exists the voice message is converted to a documented message, block 846. The mailbox of the associated computer ID=P$_{B-PC}$ is called, block 848. Since the associated computer has direct connectivity to the OIS 742 in the Provider Network-B 740, the call placed to the associated computer is directed to the OIS which is awaiting computer connection requests, block 850. The document message is routed to the mailbox of the associated computer ID=P$_{B-PC}$, block 852, completing the action and the flow is stopped, block 854. In this way both the original voice message and the documented message from the caller USER$_{A4}$ is available to USER$_{A2}$. In the same manner, a computer generated message from one user may be sent to another user as either or both a document and a synthesized voice message.

The present invention is also used to advantage for multi-media cross services. In these services both data and voice networks are tools for collaboration of a plurality of users. These services enable people to collaborate with other people through real time voice and data telephony communication in a plurality of modalities with various access media. The services enable applications to collaborate with other applications through isochronous or asynchronous protocols. With the advent of multi-media, there are increasing service requirements to allow the admixture of these forms. The CSADm offerings allow end users to participate in multi-media conferences by associating disparate devices, user interfaces, and collaboration techniques. It enables voice and/or data real time collaboration for multiple users. Depending upon the multi-media conferencing technique used, each user may employ one or more telephone lines.

Although the description made herein is for particular configurations and arrangements, the intent and concept of the present invention are suitable and applicable to other configurations and arrangements. It will be clear to those skilled in the art that other modifications to the disclosed embodiments can be effected without departing from the spirit and scope of the present invention.

What is claimed is:

1. A network apparatus for a network providing communication between a plurality of network service providers and a plurality of primary users, wherein each of said plurality of network service providers assigns, respectively, a unique primary IDENTIFIER to each of said primary users, each of said plurality of network service providers being independent of others of said plurality of network service providers, said apparatus comprising:

a primary user interface means for interfacing with said primary users;

a cross connect means coupled to said primary user interface means;

a primary user database means for storing said primary IDENTIFIERs as a sole means for associating an input from each of said primary users when establishing communication between one network service provider and another network service provider, said primary user image database being coupled to said cross connect means; and control means coupled to said database means and responsive to said input from a primary user of a primary IDENTIFIER of said primary user assigned by one of said plurality of network service providers, for accessing from said database means a further primary IDENTIFIER of said primary user assigned by another one of said plurality of network service providers, to enable accomplishment of an action which requires said further primary identifier.

2. An apparatus as recited in claim 1 further comprising at least one remote service means, said service means including a remote user interface means for coupling to a plurality of remote users having a plurality of remote IDENTIFIERs.

3. An apparatus as recited in claim 1 wherein each of a plurality of said primary users has a plurality of primary access means being coupled to said primary interface means.

4. An apparatus as recited in claim 3 wherein at least one of said primary access means operates in a first domain and at least one other operates in a second domain.

5. An apparatus as recited in claim 4 wherein said first domain corresponds to a telephone number and said second domain corresponds to an Internet access address.

6. An apparatus as recited in claim 2 wherein said apparatus operates in a first domain and said remote service means operates in a second domain, said apparatus further comprising a converting means having a converting input and a converting output for converting a signal fed to said converter input in said second domain to a signal fed out of said converter output in said first domain.

7. An apparatus as recited in claim 6 wherein said converting means includes a means to convert information from a first protocol to a second protocol.

8. An apparatus as recited in claim 2 wherein said remote service means included a remote user image mapping means for associating and storing said IDENTIFIERs for each of said remote users.

9. An apparatus as recited in claim 9 wherein at least one of said remote users is a provider of still another service.

10. An apparatus as recited in claim 2 wherein a plurality of said remote users have a plurality of remote user interface access media.

11. An apparatus as recited in claim 10 wherein at least one of said remote user interface access media is a remote telephone.

12. An apparatus as recited in claim 2 wherein each of a plurality of said remote users has a plurality of remote IDENTIFIERs.

13. An apparatus as recited in claim 12 wherein said remote service means includes a secondary mapping of said remote IDENTIFIERs for each of said remote users.

14. An apparatus as recited in claim 12 wherein said primary database includes said remote user IDENTIFIERs.

15. An apparatus as recited in claim 14 wherein said apparatus upon receiving a request from one of said remote users uses one of said remote IDENTIFIERs to recognize said remote user, and uses another one of said remote IDENTIFIERs as an IDENTIFIER to access a primary service provided by one of said primary users.

16. An apparatus as recited in claim 2 wherein said apparatus upon receiving a request for service from one of said primary users uses one of said user IDENTIFIERs to recognize said primary user, and uses another one of said user IDENTIFIERS as an IDENTIFIER to access a user service to service said request for service.

17. An apparatus as recited in claim 16 wherein said request is for a user service provided by said remote service means.

18. An apparatus as in claim 2 wherein said means for associating and storing includes a means for providing a cross service association domain mapping of said plurality of service IDENTIFIERs for each of said primary users.

19. An apparatus as recited in claim 2 wherein said remote service means further comprises a domain conversion means for converting a signal received in a first domain to a signal in a second domain.

20. An apparatus as recited in claim 2 wherein at least one of said primary users has a plurality of apparatus access means.

21. An apparatus as recited in claim 20 wherein at least one of said access means is a computer and at least one other of said access means is a telephone.

22. An apparatus as recited in claim 1, wherein said apparatus receives a connection request from one of said primary users using a first domain, for connection with another one of said primary users using a second domain.

23. An apparatus as recited in claim 22, wherein said first domain is a telephone number.

24. The apparatus of claim 1 further comprising a common image operation means for performing a user related operation upon said user image database.

25. An apparatus of claim 24 wherein said operation is a billing operation for collectively billing each of said primary users for a plurality of service utilizations of a plurality of service IDENTIFIERs of said each of said primary users.

26. An apparatus of claim 25 wherein said billing operation bills said each of said primary users for telephony services and online information services.

27. An apparatus as recited in claim 1 wherein a plurality of said primary users are service users of a plurality of user services and each of said service IDENTIFIERS is an identification for identifying one of said service users when said one of said service users makes a request for one of said user services as required by said user service to provide satisfaction of said request.

28. An apparatus as recited in claim 1 wherein said database is used to determine a first user's first IDENTIFIER required for said first user to access a first service by associating said first user's second IDENTIFIER for a second service, so that said first user may access said first service by accessing said second service using said second IDENTIFIER.

29. An apparatus as recited in claim 28 wherein said first service is an on-line information service and said second service is a voice telephone service.

30. An apparatus as in claim 1 wherein said database means stores a plurality of separate passwords for at least one of said users corresponding with each of at least two of said primary IDENTIFIERs.

31. An apparatus as in claim 30 where one of said passwords is entered by a first user of said primary users to verify said first user for a first service offering and another said separate password is retrieved from said database to provide verification of said first user for a second service offering.

32. An apparatus as recited in claim 1 wherein said apparatus operates in a first protocol and wherein at least one of said remote service means operates in a second protocol, said apparatus further comprising a protocol converting means for converting between said first and second protocols.

33. A shared service apparatus serving a plurality of independent network service providers, each of said independent network service providers serving a plurality of service users, each of said service users having a plurality of service IDENTIFIERs, each one of said service IDENTIFIERs assigned by a respective one of said independent network service providers and used to identify one of said service users for a user service provided by said respective one of said independent network service providers, said apparatus comprising:

a user image database means for storing and associating said service IDENTIFIERs of each of said service users;

a communications linkage means for linking to at least two of said service providers and for making information stored in said database means accessible to each of said at least two of said service providers; and conversion means having a converter input and a converter output for converting a first signal representing one of said service IDENTIFIERs fed to said converter input in a first domain to a second signal representing said one of said service IDENTIFIERs in a second domain, wherein said converter inputs and said converter outputs are accessible to at plural ones of said service providers, said conversion means further including means for converting information received at said converter input in a first modality to information fed out of said converter output in a second modality.

34. An apparatus as recited in claim 33 wherein said first modality is a voice message and said second modality is a document message.

35. An apparatus as recited in claim 33 wherein said conversion means is also for converting information fed to said input in a first protocol to information fed out of said output in a second protocol.

36. An apparatus as recited in claim 33 wherein said user image database means forms a cross service association domain mapping such that a first user accessing a first service of said user services using a first user first IDENTIFIER in a first domain, crosses said first service to access a second service of said user services requiring access using a first user second IDENTIFIER in a second domain, without said first user entering said first user second ID, and wherein said first user second IDENTIFIER is provided to said second service by said first service which received said second IDENTIFIER by exercising said cross service association domain mapping for said first IDENTIFIER.

37. An apparatus as recited in claim 36 wherein said second service is provided by a service provider not adapted to use said database.

38. An apparatus as recited in claim 36 wherein said second user service is provided by a service provider not cooperating with said database.

39. An apparatus as recited in claim 33 further comprising a common billing means for provided a common bill for each of said entity users based upon said each of said users utilization of said entity user services accessed from any of said plurality of service IDENTIFIERs.

40. An apparatus as recited in claim 39 in which said billing means includes a means for monitoring payment of bill data for each of said users.

41. An apparatus as recited in claim 40 further including a means for providing information of good and bad bill paying habits for each of said users.

42. An apparatus as recited in claim 41 further comprising a first histogram means for monitoring and maintaining a record of service usage for each of said users and for each of said user services.

43. An apparatus as recited in claim 42 wherein said record of service usage is used to provide information for a function selected from the functional group consisting of offering other services, reducing service rates, service advertisement, service abandonment, service enhancement, service maintenance, to one of said service user and any combination of these.

44. A network apparatus including a plurality of independent network service providers, each one of said independent network service providers providing a plurality of user services for a plurality of service users, each of said service users being an owner of a plurality of service IDENTIFIERs, each independent network service provider assigning said service IDENTIFIERs to identify said owner for respective ones of said services, said apparatus comprising:

a cross service association domain mapping means for associating said service IDENTIFIERs with said owner and with a related one of said user services, said mapping means using said service IDENTIFIERs assigned by said independent network service providers as a sole means for said associating;

a storage means for storing said mapping means; and an interrogation means having an input and an output, said input for receiving an interrogation from a first user service for an IDENTIFIER association mapping for a first IDENTIFIER provided by a first owner, said output for outputting a resulting IDENTIFIER association for said first owner.

45. An apparatus as recited in claim 44 wherein said resulting IDENTIFIER association mapping is used to provide said first owner with access to a second user service.

46. An apparatus as recited in claim 45 wherein said first user service is provided by a first one of said entities and said second user service is provided by a second one of said entities.

47. An apparatus as recited in claim 45 wherein access to said first user service is in a first domain and access to said second user service is in a second domain.

48. An apparatus as recited in claim 45 included in a network environment which includes at least one service provider that does not have a cross service association domain mapping means.

49. An apparatus as recited in claim 44 wherein the mapping means accessed by a first service provider user associates said plurality of IDENTIFIERs also for a plurality of second service provider users.

50. A cross service apparatus comprising:

an enhanced telephone service means having a plurality of primary service users, each of said primary service users having at least one primary service provider connection, said service users including a plurality of enhanced primary users having a plurality of said primary service provider connections using a plurality of access media, each said primary service provider connection having an access IDENTIFIER assigned by an independent primary service provider, said enhanced telephone service means includes a primary cross service provider association domain mapping means for associating each one of said access IDENTIFIERs with a connection owner, and with each other one of said access IDENTIFIERs owned by said connection owner, resulting in a common association of an image of each of a plurality of connection owners;

a storage means for storing said common association for said connection owners;

a service control means for interrogating, controlling and monitoring said common association; and media transformation means for transforming a message sent in a first modality to a message forwarded in a second modality.

51. An apparatus as recited in claim 50 wherein said primary service connections of at least one of said enhanced primary users include at least one telephone and at least one computer.

52. An apparatus as recited in claim 50 wherein said enhanced users includes at least one voice connection medium and at least one data connection medium.

53. An apparatus as recited in claim 50 wherein said access media for at least one of said enhanced users includes a multi-media computer having a voice connection and a data connection.

54. An apparatus as recited in claim 53 wherein said voice connection is connected to first network entity and said data connection is connected to a second network entity.

55. An apparatus as recited in claim 50 wherein at least one of said enhanced users uses a first of said primary service provider connections to modify a parameter related to a second of said primary service provider connections.

56. An apparatus as recited in claim 55 wherein said first and second primary service provider connections are included in said common association for said connection owner.

57. An apparatus as recited in claim 55 wherein said first primary service provider connection is accessed by a computer, said second primary service provider connection is for a first telephone, and said parameter is a time period for call-forwarding a phone call placed to said first telephone to a second telephone.

58. An apparatus as recited in claim 50 wherein said enhanced telephone service means further comprises a remote interface means for interfacing with a remote network entity, said remote entity having a plurality of remote entity users having at least one remote entity service connection, each remote entity service connection having an IDENTIFIER and at least one remote entity service offering, and wherein a plurality of said remote entity users have a plurality of remote entity service connections.

59. An apparatus as recited in claim 58 wherein said cross service domain mapping means includes a mapping of each of said remote entity users.

60. An apparatus as recited in claim 59 wherein said cross service domain mapping means is accessible to said remote entity.

61. An apparatus as recited in claim 58 wherein said remote entity includes a remote cross service association domain mapping means for mapping each of said remote entity service users.

62. An apparatus as recited in claim 61 wherein said primary cross service association domain mapping means is accessible to said remote entity and said remote cross service association domain mapping means is accessible to said enhanced telephone service means.

63. An apparatus as recited in claim 62 wherein one of said primary service users is also an owner of a first remote service connection and uses one of said primary service connections to modify a parameter of a remote medium connected to said first remote service connection.

64. An apparatus as recited in claim 50 wherein said first modality is voice and said second modality is a document.

65. An apparatus as recited in claim 50 wherein said media transformation means is shared by another network entity.

66. An apparatus as recited in claim 50 wherein said first modality is used for sending and receiving an e-mail message and said second modality is used for sending and receiving a voice mail message.

* * * * *

UNITED STATES PATENT AND TRADEMARK OFFICE
CERTIFICATE OF CORRECTION

PATENT NO. : 6,064,666
DATED : May 16, 2000
INVENTOR(S) : Barry E. Willner, et. al.

It is certified that error appears in the above-identified patent and that said Letters Patent is hereby corrected as shown below:

Title page, item [75], inventor: add Louis P. Herzberg--.

Signed and Sealed this

Twelfth Day of September, 2000

Attest:

Q. TODD DICKINSON

*Attesting Officer*      *Director of Patents and Trademarks*